(No Model.)

W. H. MacKAY.
ELECTRIC LIGHTING SYSTEM.

No. 485,287. Patented Nov. 1, 1892.

Witnesses:
Sidney P. Hollingsworth
James F. Duhamel

W. H. MacKay
Inventor;
by his attorneys,
Dodge & Sons.

UNITED STATES PATENT OFFICE.

WILLIAM H. MacKAY, OF ROANOKE, VIRGINIA.

ELECTRIC-LIGHTING SYSTEM.

SPECIFICATION forming part of Letters Patent No. 485,287, dated November 1, 1892.

Application filed June 13, 1892. Serial No. 436,547. (No model.)

*To all whom it may concern:*

Be it known that I, WILLIAM H. MACKAY, a citizen of the United States, residing at Roanoke, in the county of Roanoke and State of Virginia, have invented certain new and useful Improvements in Electric-Lighting Systems, of which the following is a specification.

My invention relates to an improved system of electric lighting, as hereinafter set forth and claimed.

The present invention is directed more particularly to the utilization or adaptation of the electric-railway wires or circuits for the light-circuit, whereby the duplication of wires or circuits is avoided; and this result is secured by placing the lights in a branch of the main railway-circuit and providing means whereby this branch circuit containing a number of lights may be closed from a single point.

Figure 1:
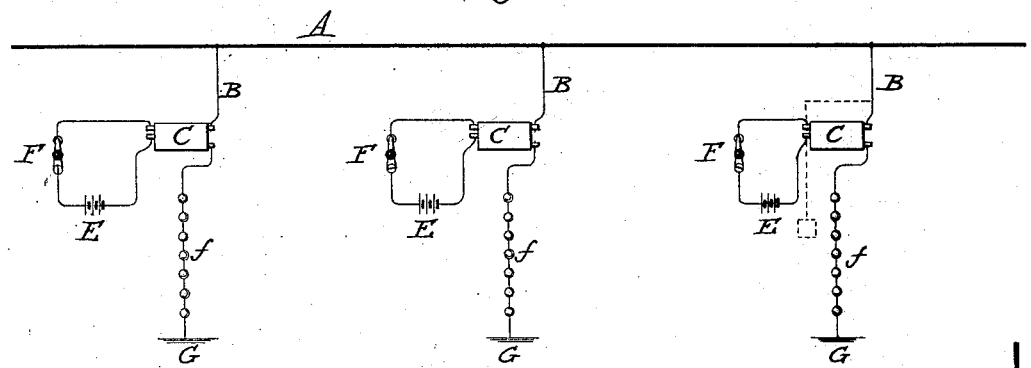
Figure 2:
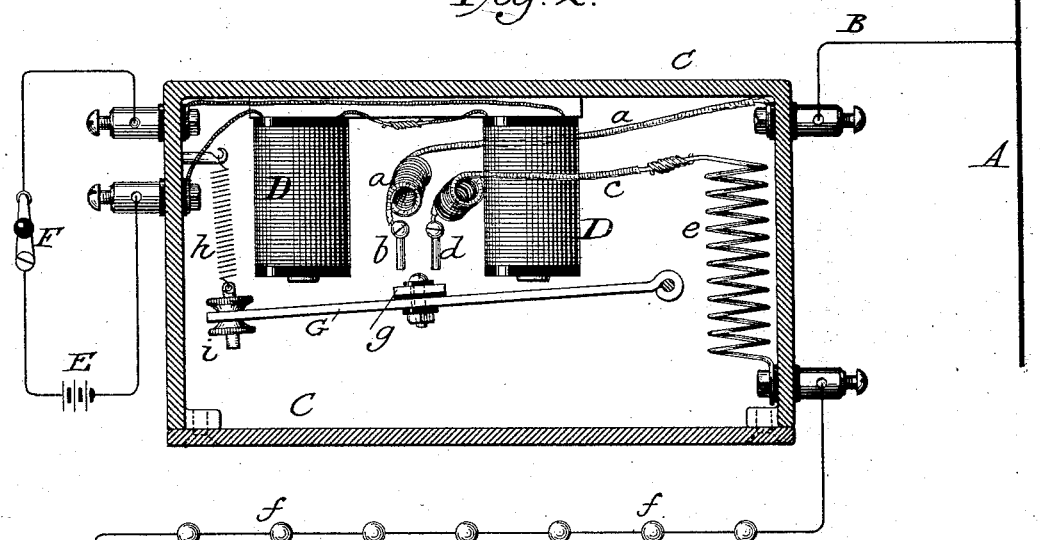
Figure 3:
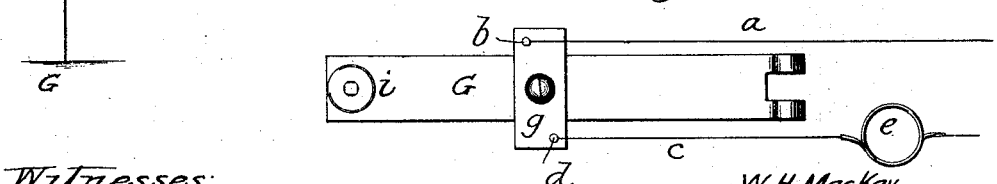

In the drawings, Figure 1 is a diagrammatic view. Fig. 2 is a view illustrating the arrangement of and the means for closing one of the branch light-circuits, and Fig. 3 a top plan view of the armature shown in Fig. 2.

A indicates the line wire or circuit of an electric railway, said wire or circuit having a normally-open branch or light circuit B. This circuit B comprises the wire $a$, connected at one end to the line A and having at the opposite end the electrode $b$. A second wire $c$, also having an electrode $d$, contains a resistance or choking coil $e$, advisably of German silver, and the lamps or lights $f$, and is connected at its end with the ground. The ends of the wires $a$ and $c$, having the electrodes and the coil, will be located within a box C, in which is also placed the electro-magnet D, which is energized by current from the battery E or other source of electricity when the switch F is brought to the position shown in Fig. 2.

G indicates the armature carrying an insulated plate $g$, which is adapted to make contact with the electrodes $b$ and $d$ when the magnet is energized, and thereby close the circuit B. This armature is provided, also, with a spring $h$ and screw $i$, by adjusting which the armature may be kept within the field of the magnet.

Normally the parts are in the position shown in Fig. 2, with the armature-plate $g$ away from the electrodes $b$ and $d$, thus preventing the current from leaving the main railway wire or circuit. Now when it is desired to throw the branch light line into circuit it is only necessary to throw the switch F to the position shown in Fig. 2. The electro-magnet being thus energized, causes the armature to move upward and bring its plate $g$ into contact with the electrodes $b$ $d$. The current then travels from the wire A through wire $a$ and electrode $b$, thence through plate $g$ into electrode $d$, wire $c$, coil $e$, and into the lamps $f$, which latter are shown as arranged in series. The lamps, which may be either arc or incandescent, may, if desired, be arranged in multiple arc. The resistance-coil $e$, which may be a rheostat, if desired, is intended to prevent the lamps or the branch circuit in which they are included from being burnt out by an undue supply of current thereto.

It is my intention to arrange the lights in groups of ten (more or less) and to have a number of branch circuits connecting with the wire A, so that any one of the different groups of lights may be thrown into circuit independently of the others, as will be understood upon reference to Fig. 1.

What I claim is—

In combination with the railway line or circuit A, the circuit B, branching therefrom and comprising the wires $a$ $c$, electrodes $b$ $d$, coil $e$, and lamps $f$, the electro-magnet D, armature G, provided with plate $g$ and the local circuit and switch.

In witness whereof I hereunto set my hand in the presence of two witnesses.

WILLIAM H. MACKAY.

Witnesses:
HORACE A. DODGE,
WALTER S. DODGE.